United States Patent
Goett et al.

(10) Patent No.: US 6,563,045 B2
(45) Date of Patent: May 13, 2003

(54) LIGHTWEIGHT SHIELDED CONDUIT

(75) Inventors: Edward P. Goett, Healdsburg, CA (US); Roger Woehl, Novato, CA (US)

(73) Assignee: Icore International, Inc., Santa Rosa, CA (US)

( * ) Notice: Subject to any disclaimer, the term of this patent is extended or adjusted under 35 U.S.C. 154(b) by 0 days.

(21) Appl. No.: 09/885,986

(22) Filed: Jun. 18, 2001

(65) Prior Publication Data

US 2001/0030054 A1 Oct. 18, 2001

Related U.S. Application Data

(63) Continuation-in-part of application No. 09/277,324, filed on Mar. 26, 1999, now abandoned.
(60) Provisional application No. 06/079,504, filed on Mar. 26, 1998.

(51) Int. Cl.$^7$ .............................. H01B 7/34; H01B 7/00
(52) U.S. Cl. ..................................... 174/36; 174/122 R
(58) Field of Search .............................. 174/36, 102 R, 174/102 SC, 102 C, 106 R, 106 D, 108, 120 R, 120 SR, 121 R, 121 SR, 122 R, 124 R

(56) References Cited

U.S. PATENT DOCUMENTS

| | | | | |
|---|---|---|---|---|
| 2,830,622 A | * | 4/1958 | Roberts et al. | 138/121 |
| 3,028,276 A | * | 4/1962 | Roberts et al. | 138/121 |
| 3,076,737 A | * | 2/1963 | Roberts | 138/121 |
| 3,626,988 A | * | 12/1971 | Chu | 138/121 |
| 4,112,247 A | * | 9/1978 | Dembiak et al. | 174/102 D |
| 4,262,704 A | * | 4/1981 | Grawey | 138/125 |
| 4,342,612 A | * | 8/1982 | Lalikos et al. | 138/121 |
| 4,393,928 A | * | 7/1983 | Warnock, Sr. | 137/329.03 |
| 4,510,974 A | * | 4/1985 | Natori et al. | 138/124 |
| 4,683,917 A | * | 8/1987 | Bartholomew | 138/109 |
| 4,758,455 A | * | 7/1988 | Campbell et al. | 138/125 |
| 4,780,574 A | * | 10/1988 | Neuroth | 156/52 |
| 5,105,054 A | * | 4/1992 | Kirma | 174/2 |
| 5,129,428 A | * | 7/1992 | Winter et al. | 138/104 |
| 5,413,147 A | * | 5/1995 | Moreiras et al. | 138/109 |
| 5,482,089 A | * | 1/1996 | Weber et al. | 138/103 |
| 5,485,870 A | * | 1/1996 | Kraik | 138/121 |
| 5,611,374 A | * | 3/1997 | Blin et al. | 138/121 |

* cited by examiner

Primary Examiner—Dean A. Reichard
Assistant Examiner—William H. Mayo, III
(74) Attorney, Agent, or Firm—Larry D. Johnson; Craig M. Stainbrook; Johnson & Stainbrook, LLP

(57) ABSTRACT

A lightweight flexible conduit particularly suitable for aircraft applications for shielding electrical wire and cable from electromagnetic interference and radio frequency interference. The apparatus including an inner core of elastically deformable flexible tubing having an outside surface of helical corrugations, metalized fabric wrapped around the helical corrugations and post-formed onto the corrugated helix of the core by string, thread, or wire which pulls the fabric down into the base of the continuous trough of the corrugations, and a protective jacket. A preferred embodiment of the present invention includes an axial drain wire incorporated into the lamination and running the length of the conduit to provide lower ground path resistance.

12 Claims, 2 Drawing Sheets

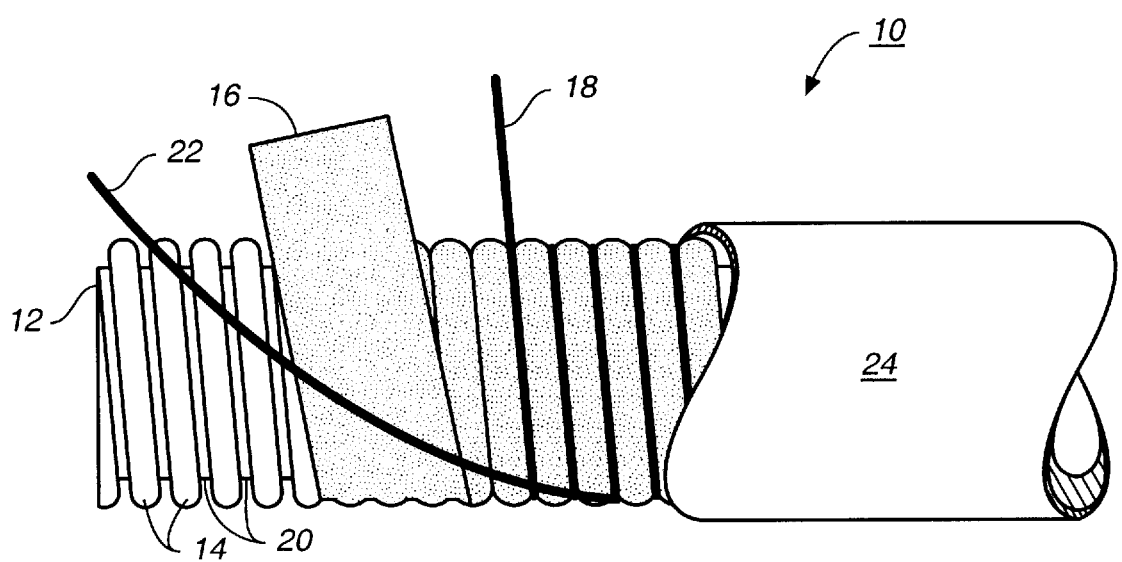
FIG._1

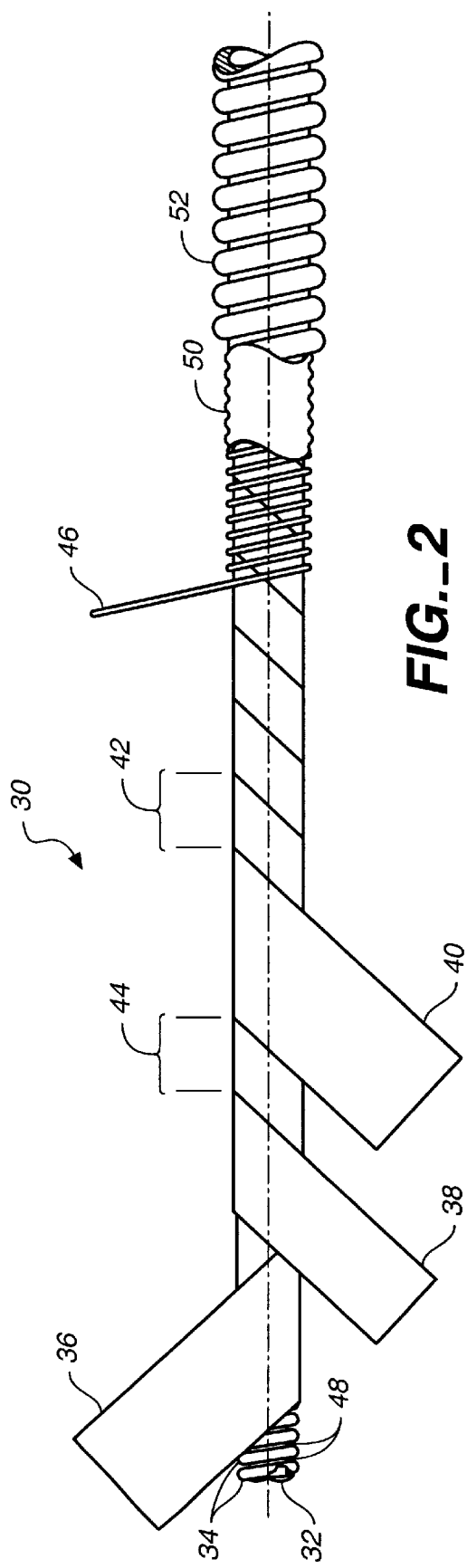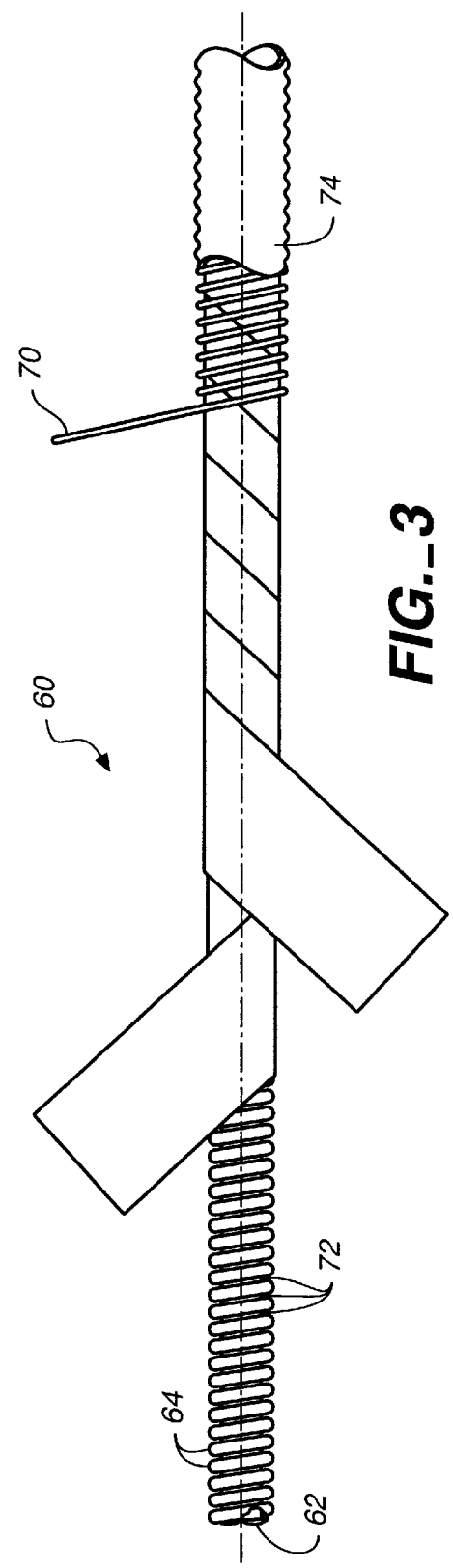

LIGHTWEIGHT SHIELDED CONDUIT

CROSS REFERENCE TO RELATED APPLICATIONS

This application is a continuation-in-part of pending U.S. patent application Ser. No. 09/277,324, filed Mar. 26, 1999 (now abandoned), which, claims the benefit of the filing date Provisional Application Serial No. 60/079,504, filed Mar. 26, 1998.

BACKGROUND OF THE INVENTION

1. Field of the Invention

The present invention relates to electrical wire and coaxial signal cable conduits with protective shielding, and more particularly to flexible lightweight conduits having conductive shielding layers to protect cables and wires from environmental conditions and to prevent electromagnetic interference (EMI) and radio frequency interference (RFI) from passing into and out from the conduit.

2. Description of the Prior Art

It is well known in the art that electrical signal transmission lines must be protected from other nearby lines and more generally from ambient electromagnetic interference (EMI) and radio frequency interference (RFI). EMI and RFI protection is of paramount importance in aircraft, and more so as they increasingly utilize new communication, navigation, radar, and computerized components critical to flight safety and economy. Such aircraft components and their associated cables and wires both emit and are vulnerable to EMI and RFI. Thus, aircraft manufacturers have a distinct interest in making aircraft with electronic components that operate free of EMI and RFI.

Aircraft manufacturers, in particular, are constantly seeking ways to reduce overall aircraft weight. This, too, increases flight safety and economy. Traditionally, the conduits used to house and protect electrical cables and wires for aeronautical applications and avionics have utilized heavy tin-plated copper metal overbraid for EMI and RFI shielding. The wire overbraid is comprised of strands of copper core wire plated with tin to protect against corrosion. However, an overbraid has several limitations. Most notably, the large number of strands needed to cover a conduit with the 90 percent coverage required for proper shielding is the largest single weight component of shielded conduits. Thus, it is desirable to have a lightweight means of providing effective EMI and RFI shielded conduits.

Another limitation of overbraid concerns its lack of longevity: as is well known in the field, the performance of overbraid deteriorates over time through flexing and vibration. Flexing in particular causes the copper in the braids to work harden and eventually to break. Thus, an effective but more durable EMI/RFI shielding for conduit is desirable.

Finally, metal overbraid allows for very limited control of the degree of shielding effectiveness. The amount of shielding can be increased only in large increments by adding complete layers of overbraid. This limits the ability to minimize weight by tailoring the conduit's EMI shielding effectiveness to its specific requirements. Thus, a more adaptable shielding technique is desirable.

One solution to the weight problem consists of jacketing conduit with wraparound metal foils laminated onto thin plastic tape. Shielded cables are fabricated by winding the foils around wires or a conduit. However, metal foils are generally not rugged enough to withstand the flexing and vibration of many conduit applications. So even though the foil does provide lightweight shielding, its effectiveness also diminishes as it is flexed and handled.

Another technique for providing EMI/RFI shielding involves using light cloth fabrics plated with a thin coating of metal. Metalized fabrics provide excellent EMI shielding properties, largely because the metal may be applied only where needed on the surface of the material. In addition, the cloth can be tightly woven to prevent the gaps and holes that often result in EMI penetration. For these reasons, EMI shielding effectiveness per pound of material of cloth is superior to the metal overbraid traditionally used in cables and conduits, and metalized fabric has been used extensively and successfully to provide EMI shielding on rigid electronic equipment housing.

However, metalized fabric also suffers certain limitations. While eminently suitable for rigid housing, metalized fabric, as currently used, is considerably less effective with flexible cables and conduits. This is due to the fact that the plated metal tends to flake or peel from the fabric substrate when the cloth is creased or folded. Even though the cloth can be tightly wrapped around rigid conduits, when applied to flexible conduits, the tightly woven cloth is forced to crease and fold to accommodate bends in the conduits. The result is a conduit that loses effectiveness over time.

Hoses of the inventive type are known in the art. For instance, U.S. Pat. No. 5,393,928 to Cribb, et al., entitled, Shielded Cable Assemblies, teaches lower weight shielded cable assemblies with an enhanced level of shielding effectiveness, comprising a core of at least one insulated conductor element overwrapped with metallized fabric, e.g. characterized as having a surface resistivity less than 100 milliohms/square or as being a metallized fabric coated with at least a layer of copper having a metal density of greater than 50 grams/square meter. The inventive cable assemblies may employ a shielding subassembly comprising braided wire and one or more layers of copper-metallized fabric where the shielding subassembly has a transfer impedance at 10 MHz of less than 50 mo/m. Cribb et al note that it has been found that cable assemblies employing a four layer wrap of certain metallized fabrics can provide up to 20 decibels improvement in shielding effectiveness over a wide range of frequencies with a 74 percent reduction in weight compared to a standard wire braid/foil laminate shield.

However, it should be noted that Cribb discloses nothing more than shielded cable assemblies having an insulated core element overwrapped with metalized fabric. There is not a single drawing in Cribb et al disclosing a preferred embodiment of the shielded assemblies. Rather, Cribb commends the use of metalized cloth as a shielding method. The problem in this simple solution is that flexing of the cable causes the metal plating to flake off and ultimately renders the device useless for shielding. This is a primary problem solved by the shielded conduit of the present invention.

U.S. Pat. No. 4,342,612, to Lalikos et al discloses semirigid, convoluted plastic hoses made from material such as polytetrafluoroethylene with a spiral wire spring wrapped thereon, primarily, although not exclusively, for use as a vacuum hose. The spring wire is pulled off the end of a supply bobbin and looped around a pulley or idler spool, which is a coil forming wheel having a diameter that is correlated to the diameter of the plastic hose. The wire is then pulled from the end of the forming wheel, over a controlled radius guide or shoe, to the hose surface. The looping on the forming wheel, followed by the pulling therefrom via the circular guide, gives the wire a permanently preformed circularized and spiral shape. The resulting spiral shape enables the wire to snap into the hose convolutions as it is wound directly onto the plastic hose. The relative diameter of the wire, the width of the space between the convolutions, and the diameters of the forming wheel and plastic hose are such that the wire is securely captured within the valley of the convolutions after it snaps into position. This provides the hose with dramatically increased strength to withstand substantial vacuum pressures without danger of collapsing and to withstand crushing forces from over-bending and being stepped on.

The hose disclosed in Lalikos et al is adapted for use as a vacuum hose, i.e, non-electrical hose. It is ill-suited for electrically terminating an EMI shielded conduit as it does not provide any means of EMI shielding.

U.S. Pat. No. 4,112,246, to Dembiak et al., teaches a gas feeder pipe assembly or conduit comprising a central cylindrical aluminum sheath which gives shape to a duct for carrying fluid under pressure. The sheath is coated on both sides with an adhesive film, such as a polyethylene laminate. The film bonds an overlap of the sheath after it is rolled into its cylindrical shape, and bonds an extruded polyethylene jacket to the duct formed of the sheath. The aluminum sheath in combination with the jacket results in a pressurable pipe for carrying fluids, such as dry air, in a manner consistent with prior art practices. A plurality of insulated conductors are applied around the duct in a peripheral layer. The conductors are further applied around the periphery of the duct in an oscillating lay, the lay establishes an alternately clockwise and counterclockwise oriented skew in the conductors with respect to a central axis of the duct. The lay gives additional length to the conductors with respect to the length of the duct to avoid stresses in the conductors due to variations in expansions or contractions between the duct and the conductors. The conductors are not embedded into, or otherwise made part of, the polyethylene jacket of the duct. Instead, the jacket serves as a smooth supporting surface for the peripheral lay of the conductors. The conductors are slideably held in place on the surface by a binder. An insulating polyethylene corewrap film is applied over the lay of the conductors. The film has a longitudinal overlapping portion.

Although Dembiak et al disclose a conduit having conductive bare wires and a method of incorporating the wires into the lamination around a metalized fabric tape with a slight helical wrap to act as a ground for the conduit, the wires are laid directly on the smooth surface of a conduit. This does not solve, but merely exacerbates the problem in flaking of the metalized fabric cloth. Furthermore, in numerous applications, metalized cloth is insufficient to ground cables carrying high voltage.

The lightweight shielded conduit of the present invention solves the problem of flaking and addresses the problem of using metalized fabric alone as a shield. By using metal wire to pull metalized cloth into the troughs of a conduit having standard helical convolutions, the wire becomes a helical ground wire which conducts the current to ground, rather than to the metalized cloth. This configuration entails the use of metalized cloth in different configurations to ensure long life in the shielding material and thus effective shielding over time for a variety of voltages and frequencies of shielding required under the specific application.

SUMMARY OF THE INVENTION

The lightweight shielded conduit of the present invention includes an inner core of elastically deformable flexible tubing having an outside surface of helical corrugations. Metalized fabric is wrapped around the helical corrugations of the inner core in a substantially helical fashion, and is then post-formed onto the corrugated helix of the core. The forming process preferably involves wrapping a string or wire around the fabric so as to pull the fabric down into the base of the continuous trough of the corrugations. An axial drain wire may be incorporated into the lamination when lower ground path resistance is required. This wire runs length of the conduit with only a slight helical wrapping to maintain conduit flexibility. The corrugated inner core, metalized fabric formed onto the inner core, and drain wire (if included) are encased in a protective jacket.

In a second preferred embodiment of the present invention the axial drain wire is eliminated and a second layers of shielding material is included, separated from a first layer by a layer of polyester foil. An electrically conductive reinforcement wire is wrapped around the conduit, compressing the cloth and foil tape into the convolute depressions of the helical convolutions, and a layer of shrink tubing is applied the cover the assembly.

Another embodiment of the present invention is identical to that of the second embodiment, excluding the intermediate foil layer.

The present invention has several advantages over metal overbraid and the current use of metalized fabrics. It is extremely lightweight, has increased flexibility and tolerance to vibration, has increased EMI/RFI shielding. Other advantages of using the present invention include the following: (1) metalized cloth may be formed into a flexible conduit so as to prevent flaking and delamination of the metal from the fabric substrate; (2) shielded conduit can be produced in long continuous lengths using the invention; (3) a conduit with a thinner wall than braided conduit can be produced, resulting in a lower conduit profile; (4) the degree of shielding can be precisely controlled at the time construction; and (5) shielding effectiveness can be continuously tailored and optimized to reduce weight at the time of manufacture.

BRIEF DESCRIPTION OF THE DRAWINGS

FIG. 1 is a partial cross-sectional side view in elevation of a first preferred embodiment of the lightweight shielded conduit of the present invention showing cutaways of each layer;

FIG. 2 is a partial cross-sectional side view in elevation of a second preferred embodiment of the present invention; and FIG. 3 is a partial cross-sectional side view in elevation of a third preferred embodiment of the present invention.

DETAILED DESCRIPTION OF A PREFERRED EMBODIMENT

The simplest and first embodiment of the lightweight shielded conduit of the present invention, illustrated in FIG. 1 and generally denominated 10, has a tubular inner core of elastically deformable flexible tubing 12 constructed with an outside surface of helical corrugations or convolutions 14. This conduit can be fabricated from a number of materials, including thermoplastic polymers. Metalized fabric 16, well known in the art and preferably dispensed as a narrow band of tape, is wrapped around the helical corrugations in a substantially helical fashion.

The metalized fabric 16, having been wrapped around the inner core of the conduit, is in a tubular form which will crease and fold as the core is bent. The fabric is post-formed into a shape that allows conduit flexing without creasing or folding the cloth. Accordingly, the fabric is formed onto the corrugated helix of the core. Preferably, as illustrated, the forming process entails wrapping a string or wire 18 around the fabric so as to pull the fabric down into the continuous base of the trough 20 formed by the corrugations. This lashing of the fabric brings it into continuous connection with the inner core. Alternatively, the fabric may be formed onto the corrugations by passing a helical threaded die over the fabric with a pitch and diameter to match the core. Other manufacturing methods are possible, including using a helical extrusion die to form corrugations from a straight tubing pre-laminated with fabric. An axial drain wire 22 may be incorporated into the lamination when lower ground path resistance is required. This wire runs length of the conduit with only a slight helical wrapping to maintain conduit flexibility.

The corrugated inner core 12 and metalized fabric 16 formed onto said inner core are encased in a protective jacket 24, preferably composed of an extruded thermoplastic polymer.

The amount of shielding effectiveness can be controlled at the time of manufacture by the number of layers of metalized fabric 16 that are applied. The number of layers can, in turn, be controlled by the number of wraps and the amount of overlap of each wrap. Once formed into the corrugations of the core, the fibers of the fabric are pliable enough to take a permanent set in the corrugated form.

The helical formed laminated core and fabric constitute a basic conduit with many electrical and mechanical properties that cannot be obtained with traditional braid covered core. The rolling corrugations of the conduit allow the metalized fabric to flex in a way that will not damage the fabric. On the inside diameter of a bend, the fabric is in compression, and the corrugations cause the fabric to bend in a controlled fashion that prevents it from creasing as the compressed tubing bunches together. On the outside diameter of a bend in the conduit, the helical rolls allow the fabric material to expand so that the tension stress on the fabric does not exceed the yield strength of the fabric's substrate material. Consequently the plating will not be caused to flake off as result of substrate yield exceeding plating yield.

The present invention is better able to withstand repeated flexing than conduits with overbraid. Overbraid accommodates conduit flexing by being loosely woven so that the braid strands reposition themselves according to the flexed shape of the conduit. This means of accommodating flexing has two limitations: first, the loose weave creates holes in the shielding that reduce EMI shielding effectiveness (the holes become increasingly large as the conduit is flexed); second, the braid strands rub against one another during movement until they eventually wear out. The helical laminated fabric of the present invention accommodates conduit bending by expansion and contraction in the rolling helical corrugations, and it does so without compromising EMI/RFI protection.

A further advantage of helical laminated fabric shielding is apparent under high vibration. The fabric uses many thin tightly woven fibers rather than the relatively thick loosely woven strands of an overbraid with comparable EMI protective properties. Additionally the fibers are much lighter than a comparable metal braid strand. As a result the mass of each fabric fiber is significantly lower than comparable overbraids. Under high vibration the tight weave and low mass of the fabric fibers actually prevent motion among and between the fibers.

The tight weave of the metalized fabric shielding provides improved shielding at higher signal frequencies where the overall shielding effectiveness can be reduced by holes or gaps in the shielding. The integrity of the fabric lamination can be enhanced by using an adhesive to bond the layers of fabric to the core. Also, flexible binding may be used to form a composite matrix to hold the fabric in the helical form, thus facilitating the entire elimination of the inner core when not needed for structural stability.

The preferred method of securing the fabric to the conduit is to wrap a string, thread, or wire to pull and secure the fabric in the continuous helical trough of the corrugations. An electrically conductive bare wrap wire can be used to increase the electrical performance as well as to improve the mechanical integrity of the conduit. A wrap wire serves several functions. The low metal content of the fabric results in a higher ground resistance than comparable overbraid shields. The wire provides a lower resistance path to ground for the electromagnetic currents captured the fabric. The wrap wire has a higher current carrying capacity than the fabric, and so it protects the fabric from being burned by current spikes, such as those caused by lightning strikes to an aircraft. An additional function of the wire is to provide a continuous ground path both circumferentially and axially along the length of the conduit. This function is significant in increasing the life of the conduit, when under extreme vibration and flexing the metal coating on the fabric exterior begins to deteriorate. If enough metal flakes off the fabric, the path to ground of a portion of the conduit could be cut off. The wrap wire assures grounding even though an entire circumferential gap may develop in the fabric.

The wrap wire also plays an important role in terminating and electrically grounding the fabric-laminated conduit to a conductive end fitting. Terminating the fabric has been one of the barriers to developing lightweight fabric shielded conduits, as electrical connections cannot be soldered to fabric. This has required that mechanical crimping methods be used as termination alternatives. However, when fabric is crimped, the plastic substrate can be crushed, thereby forcing the less malleable plating to flake off. Consequently, the path to ground can be disrupted at the point of termination.

The solution to this problem in the present invention is in the wrap wire, which provides a reliable ground that can be soldered or crimped using traditional termination methods. The wrap wire also provides mechanical crush protection when a high strength wire is used.

When even lower ground path resistance is required an axial drain wire 22 can be incorporated into the lamination. This wire runs down the length of the conduit with only a slight helical wrapping to maintain conduit flexibility. Drain wire has a shorter distance and, consequently, lower resistance than the helical wire.

Other enhancements well known in the art can be made to the laminated conduit to enable it to better endure various physical and electrical insults. Such improvements include encasing the conduit in various jacketing materials to protect the conduit from specific environmental conditions.

In a second preferred embodiment of the present invention, generally denominated by reference numeral 30 in FIG. 2, the shielding conduit eliminates the axial drain wire and incorporates a plurality of layers of shielding material. Specifically, the conduit comprises a plastic core conduit 32 having standard helical convolutions 34. A first layer of metalized fabric 36, preferably nickel-plated copper cloth, is wrapped in a slightly helical manner directly over the core conduit, followed by an intermediate layer of overwrap 38, preferably fabricated of polyester foil tape wrapped in the opposite direction as the first layer of copper cloth, and then a final layer of metalized fabric 40, again preferably nickel-plated copper cloth and wrapped in the same direction as the polyester foil tape layer. Each of the layers of metalized fabric should be wrapped with an overlap 42 comprising approximately $4/10$ths the width of the cloth. The intermediate layer of overwrapped polyester foil tape is overlapped 44 approximately $1/5$th the width of the tape to ensure complete coverage of the underlying layer of metalized fabric.

An electrically conductive reinforcement wire 46 is wrapped around the conduit, compressing the cloth and foil tape into the convolute depressions 48 of the helical convolutions 34.

Finally, a layer of shrink tubing 50 is applied over the wire, cloth and foil layers and shrunk with a heat gun to a tight fit onto the composite conduit. Optionally, the entire conduit can be jacketed with an outer convoluted jacketing 52.

In yet another, third preferred embodiment of the present invention 60 is identical to that of the second embodiment, but it excludes the intermediate foil layer. Thus, the third preferred embodiment comprises a core conduit 62 having a standard convolution 64, and a first and second layer of metalized fabric 66, 68, wrapped in a slight helical manner around the conduit in opposite directions. An electrically conductive reinforcement wire 70 pulls the fabric down into the convolutions 72 of the core conduit, and a shrink wrap jacket 74 protects the entire assembly.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A lightweight flexible electrical shielding conduit, comprising:

a tubular inner core having a helically corrugated outer surface forming a continuous trough having a continuous base on said outer surface;

first and said second layers of metalized fabric wrapped helically around and fully encasing said tubular inner core in opposite directions; and lashing means for securing said first and second layers of metalized fabric onto said outer surface and for urging said first and second layers of metalized fabric into continuous interconnection with said continuous base of said continuous trough.

2. The lightweight flexible electrical shielding conduit of claim 1, wherein said first and second layers of metalized fabric comprise nickel-plated copper cloth.

3. The lightweight flexible electrical shielding conduit of claim 1, wherein said intermediate layer of overwrap is fabricated of polyester foil tape.

4. The lightweight flexible electrical shielding conduit of claim 1, wherein said intermediate layer of overwrap is wrapped helically in the opposite direction as that of said first layer of metalized fabric.

5. The lightweight flexible electrical shielding conduit of claim 1, further including a layer of shrink tubing applied over said lashing means, said first and second layers of metalized fabric, and said intermediate overwrap layer.

6. The lightweight flexible electrical shielding conduit of claim 1, further including a jacket of convoluted conduit applied over said layer of shrink tubing.

7. The lightweight flexible electrical shielding conduit of claim 1, further including a layer of overwrap interposed between said first and said second layers of metalized fabric, and helically wrapped around said tubular inner core.

8. The lightweight flexible electrical shielding conduit of claim 7, wherein said first and second layers of metalized fabric comprise nickel-plated copper cloth.

9. The lightweight flexible electrical shielding conduit of claim 7, wherein said intermediate layer of overwrap is fabricated of polyester foil tape.

10. The lightweight flexible electrical shielding conduit of claim 7, wherein said intermediate layer of overwrap is wrapped helically in the opposite direction as that of said first layer of metalized fabric.

11. The lightweight flexible electrical shielding conduit of claim 1, further including a layer of shrink tubing applied over said lashing means, said first and second layers of metalized fabric, and said intermediate overwrap layer.

12. The lightweight flexible electrical shielding conduit of claim 1, further including a jacket of convoluted conduit applied over said layer of shrink tubing.

* * * * *